(12) United States Patent
Thiruvengada et al.

(10) Patent No.: US 8,957,967 B2
(45) Date of Patent: Feb. 17, 2015

(54) SYSTEM AND METHOD TO CONTROL SURVEILLANCE CAMERAS VIA THREE DIMENSIONAL METAPHOR AND CURSOR

(75) Inventors: Hari Thiruvengada, Plymouth, MN (US); Paul Derby, Lubbock, TX (US); Tom Plocher, Hugo, MN (US); Henry Chen, Beijing (CN)

(73) Assignee: Honeywell International Inc., Morristown, NJ (US)

( * ) Notice: Subject to any disclaimer, the term of this patent is extended or adjusted under 35 U.S.C. 154(b) by 468 days.

(21) Appl. No.: 13/153,018

(22) Filed: Jun. 3, 2011

(65) Prior Publication Data

US 2012/0307053 A1 Dec. 6, 2012

(51) Int. Cl.
*H04N 7/18* (2006.01)
*G06F 3/041* (2006.01)
*G06F 3/0481* (2013.01)
*H04N 5/232* (2006.01)
*G08B 13/196* (2006.01)

(52) U.S. Cl.
CPC ........ *H04N 5/23216* (2013.01); *G06F 3/04817* (2013.01); *H04N 7/185* (2013.01); *G08B 13/19686* (2013.01)
USPC .................... 348/143; 345/173; 348/E07.085

(58) Field of Classification Search
CPC .............................. H04N 7/181; H04N 7/183
See application file for complete search history.

(56) References Cited

U.S. PATENT DOCUMENTS

| | | | |
|---|---|---|---|
| 6,515,687 B1 | 2/2003 | Wynn et al. | |
| 6,698,021 B1 | 2/2004 | Amini et al. | |
| 6,965,399 B1 * | 11/2005 | Oka et al. | 348/211.99 |
| 7,839,926 B1 | 11/2010 | Metzger et al. | |
| 2002/0067412 A1 | 6/2002 | Kawai et al. | |
| 2003/0076410 A1 | 4/2003 | Beutter et al. | |
| 2004/0263476 A1 | 12/2004 | Lim et al. | |
| 2005/0028111 A1 * | 2/2005 | Schrag et al. | 715/851 |
| 2005/0225634 A1 | 10/2005 | Brunetti et al. | |
| 2007/0052803 A1 | 3/2007 | Chosak et al. | |
| 2007/0115355 A1 | 5/2007 | Mccormack | |
| 2009/0073388 A1 | 3/2009 | Dumm | |
| 2010/0026809 A1 | 2/2010 | Curry | |
| 2010/0091110 A1 * | 4/2010 | Hildreth | 348/169 |
| 2010/0151943 A1 | 6/2010 | Johnson et al. | |
| 2010/0238351 A1 | 9/2010 | Shamur et al. | |
| 2011/0043627 A1 | 2/2011 | Werling et al. | |

(Continued)

OTHER PUBLICATIONS

"U.S. Appl. No. 13/152,817, Final Office Action mailed Aug. 30, 2013", 18 pgs.

(Continued)

*Primary Examiner* — Dave Czekaj
*Assistant Examiner* — Nam Pham
(74) *Attorney, Agent, or Firm* — Schwegman Lundberg & Woessner, P.A.

(57) ABSTRACT

A system includes a video sensing device, a computer processor coupled to the video sensing device, and a display unit coupled to the computer processor. The system displays on the display unit a field of view of the video sensing device, and displays a three dimensional widget within the field of view. The widget includes one or more features for altering one or more of a location or size of the widget, thereby altering an area in the field of view covered by the widget. The system then alters one or more of a pan, a tilt, and a zoom of the video sensing device as a function of the alteration of the location or size of the widget, thereby altering the field of view of the video sensing device.

17 Claims, 8 Drawing Sheets

(56) References Cited

U.S. PATENT DOCUMENTS

| | | | |
|---|---|---|---|
| 2011/0063325 A1 | 3/2011 | Saunders | |
| 2011/0141141 A1 | 6/2011 | Kankainen | |
| 2011/0187703 A1* | 8/2011 | Patwardhan et al. | 345/419 |
| 2011/0228140 A1* | 9/2011 | Kazami | 348/240.1 |
| 2011/0317011 A1 | 12/2011 | Kono | |
| 2012/0194674 A1* | 8/2012 | Reinpoldt et al. | 348/143 |
| 2012/0306736 A1 | 12/2012 | Thiruvengada et al. | |
| 2012/0307052 A1 | 12/2012 | Thiruvengada et al. | |
| 2012/0307082 A1 | 12/2012 | Thiruvengada et al. | |

OTHER PUBLICATIONS

"U.S. Appl. No. 13/152,817, Non Final Office Action mailed May 23, 2013", 14 pgs.

"U.S. Appl. No. 13/152,817, Response filed Aug. 22, 2013 to Non Final Office Action mailed May 23, 2013", 9 pgs.

"U.S. Appl. No. 13/152,968 , Response filed Sep. 19, 2013 to Non Final Office Action mailed Jun. 20, 2013", 10 pgs.

"U.S. Appl. No. 13/152,968, Final Office Action mailed Oct. 11, 2013", 16 pgs.

"U.S. Appl. No. 13/152,968, Non Final Office Action mailed Jun. 20, 2013", 16 pgs.

"U.S. Appl. No. 13/153,077 , Response filed Apr. 29, 2013 to Non Final Office Action mailed Jan. 29, 2013", 9 pgs.

"U.S. Appl. No. 13/153,077, Final Office Action mailed Jul. 5, 2013", 15 pgs.

"U.S. Appl. No. 13/153,077, Non Final Office Action mailed Jan. 29, 2013", 13 pgs.

"U.S. Appl. No. 13/152,817, Appeal Brief filed Dec. 16, 2013", 10 pgs.

"U.S. Appl. No. 13/152,968, Appeal Brief filed Dec. 31, 2013", 16 pgs.

* cited by examiner

SYSTEM AND METHOD TO CONTROL SURVEILLANCE CAMERAS VIA THREE DIMENSIONAL METAPHOR AND CURSOR

TECHNICAL FIELD

The present disclosure relates to a system and method to control surveillance cameras, and in an embodiment, but not by way of limitation, controlling surveillance cameras via a three dimensional metaphor and cursor.

BACKGROUND

Traditionally, an operator adjusts a camera's pan, tilt, and zoom parameters via a button or spin bar to focus on a targeted area. However, it is often time-consuming and non-intuitive, since the operator cares more about the targeted viewing area afforded by the camera, rather than the abstract and numerical pan, tilt, and zoom parameters. It is extremely difficult and non-intuitive for the user to understand a camera's pan, tilt, and zoom parameters for a region of interest based on traditional 2D representations within a 3D environment, and then mentally transform them into control operations.

DETAILED DESCRIPTION

In light of the above shortcomings of the current art, an ROI-based (region of interest) methodology improves an operator's control over a pan, tilt, and zoom camera. An embodiment of an ROI three dimensional metaphor allows an operator to easily place the footprint of a camera over a location of interest. The three dimensional metaphor in a three dimensional environment accommodates and represents a depiction of a region of interest in an immersive manner within the surveillance environment. These metaphors allow the operator to control a camera's pan, tilt, and zoom parameters in an easy and seamless manner without complicated mental transformations.

One or more embodiments control a camera's pan, tilt, and zoom parameters via direct manipulation of the three dimensional control metaphor within the three dimensional environment. A region of interest volume specifies a three dimensional region of interest. The operator can easily and intuitively adjust the three dimensional region of interest with its various handlers, such as a surface handler, an edge handler, a vertex handler, a position handler, and a rotation handler. The pan, tilt, and zoom parameters can be automatically deduced from the region of interest volume using the algorithms disclosed herein.

Figure 1:
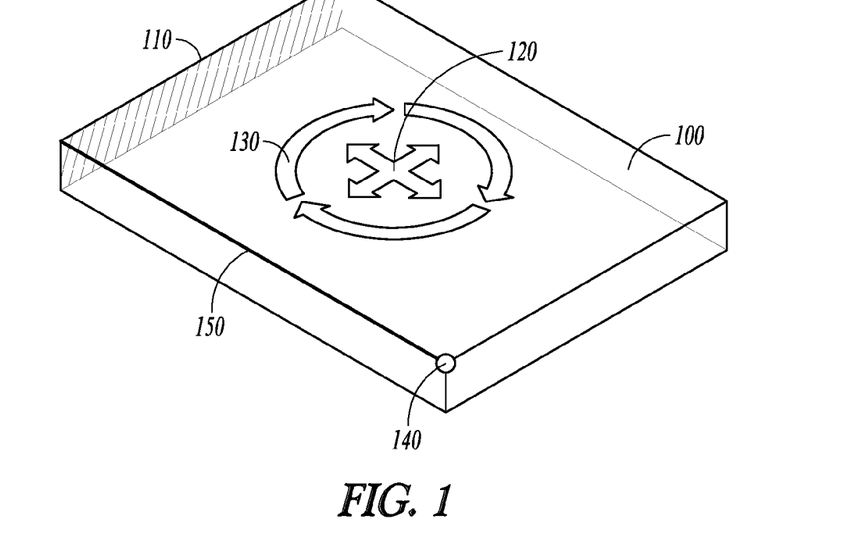
FIG. 1 is an example of an embodiment of a region of interest (ROI) three dimensional widget.

FIG. 1 is an example of an embodiment of a region of interest (ROI) three dimensional widget 100. While the widget 100 in FIG. 1 is shaped like a rectangular cube, the widget 100 can be any shape such as a sphere or a cone. The ROI widget 100 includes a surface handler 110, a position handler 120, a rotation handler 130, a vertex handler 140, and an edge handler 150. These various handlers allow an operator to change the size and position of the ROI widget 100, thereby changing the footprint of a camera, without the user having to mentally figure out the exact changes that have to be made to the pan, tilt, and zoom parameters of the camera.

Figure 2:
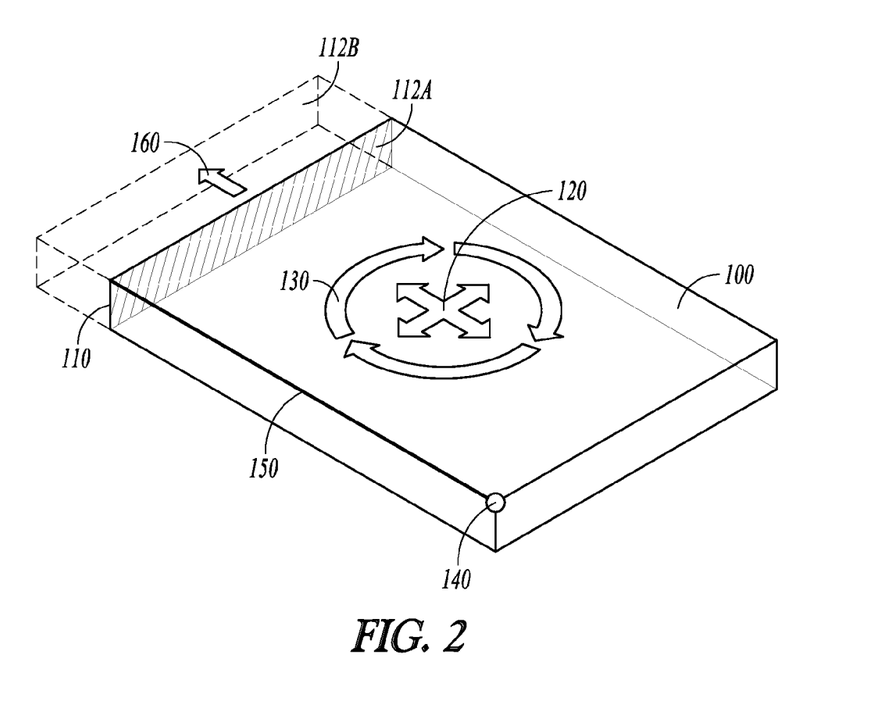
FIG. 2 illustrates a modification of a surface of the ROI widget of FIG. 1 in order to change the pan, tilt, or zoom of a camera and the field of view of the camera.

FIG. 2 illustrates the modification of a surface of the ROI widget 100 of FIG. 1 in order to change the pan, tilt, or zoom of a camera and the field of view of the camera. Specifically, FIG. 2 illustrates a manner in which the surface 112A of the widget is moved via surface handler 110 to 112B. This increases the area of widget 100, and the area of the footprint of the associated camera. The algorithm to calculate the new pan, tilt, and zoom parameters of the camera as a result of moving the surface 112A to 112B is detailed below.

Figure 3:
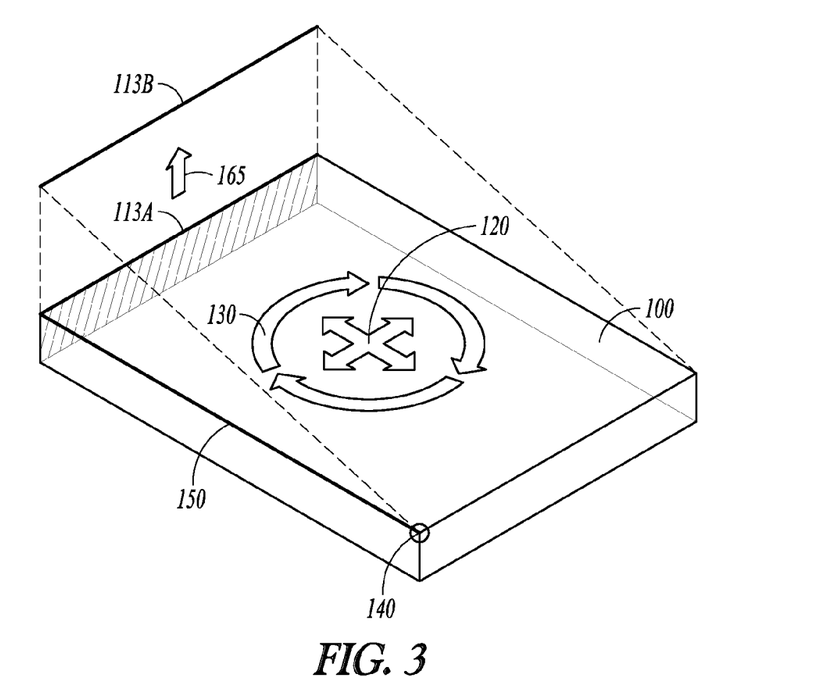
FIG. 3 illustrates a modification of an edge of the ROI widget of FIG. 1 in order to change the pan, tilt, or zoom of a camera and the field of view of the camera.

FIG. 3 illustrates the modification of an edge of the ROI widget of FIG. 1 in order to change the pan, tilt, or zoom of a camera and the field of view of the camera. FIG. 3 shows the movement of edge 113A to 113B, thereby increasing the volume of the widget 100 and the field of view of the associated camera.

Figure 4:
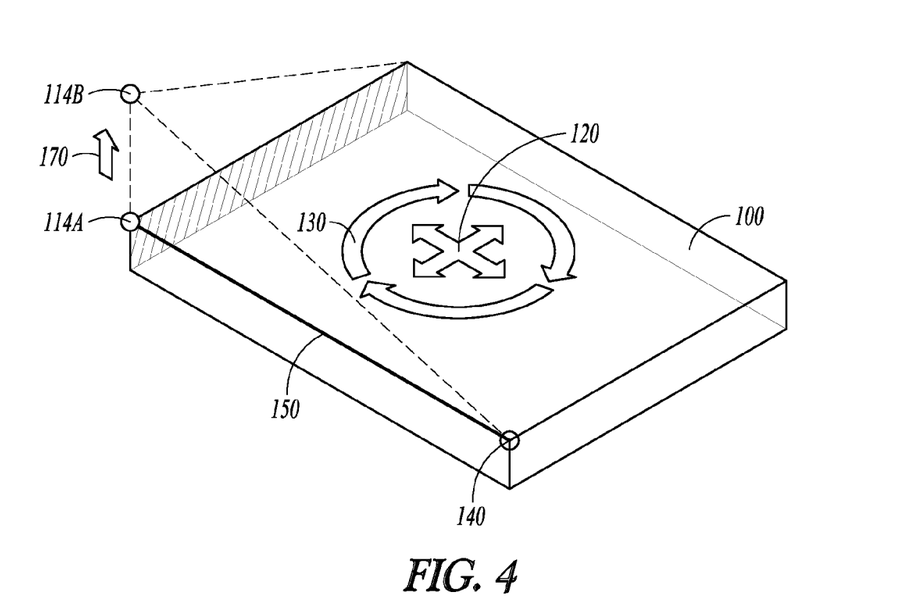
FIG. 4 illustrates a modification of a vertex of the ROI widget of FIG. 1 in order to change the pan, tilt, or zoom of a camera and the field of view of the camera.

FIG. 4 illustrates the modification of a vertex of the ROI widget of FIG. 1 in order to change the pan, tilt, or zoom of a camera and the field of view of the camera. FIG. 4 illustrates the movement of vertex 114A to 114B, thereby increasing the volume of the three dimensional widget 100, causing a change to one or more of the pan, tilt, and zoom parameters of the associated camera, and increasing the footprint of the associated camera.

Figure 5:
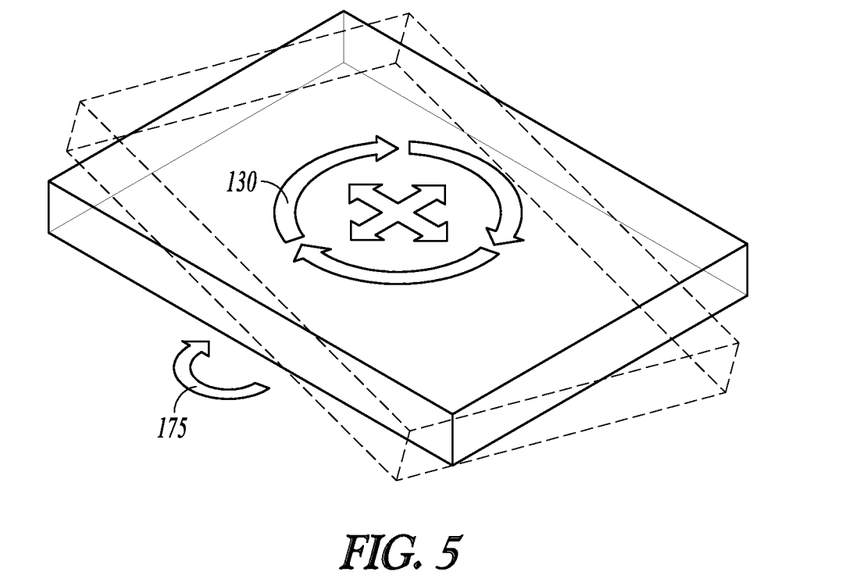
FIG. 5 illustrates a modification of a rotation handle of the ROI widget of FIG. 1 in order to change the pan, tilt, or zoom of a camera and the field of view of the camera.

FIG. 5 illustrates the modification of a rotation handle of the ROI widget of FIG. 1 in order to change the pan, tilt, or zoom of a camera and the field of view of the camera. FIG. 5 shows the use of the rotation handler 130 to change the position of the widget 100, resulting in a change in one or more of the pan, tilt, and zoom parameters of the associated camera, and causing a change in the footprint of the associated camera.

Figure 6:
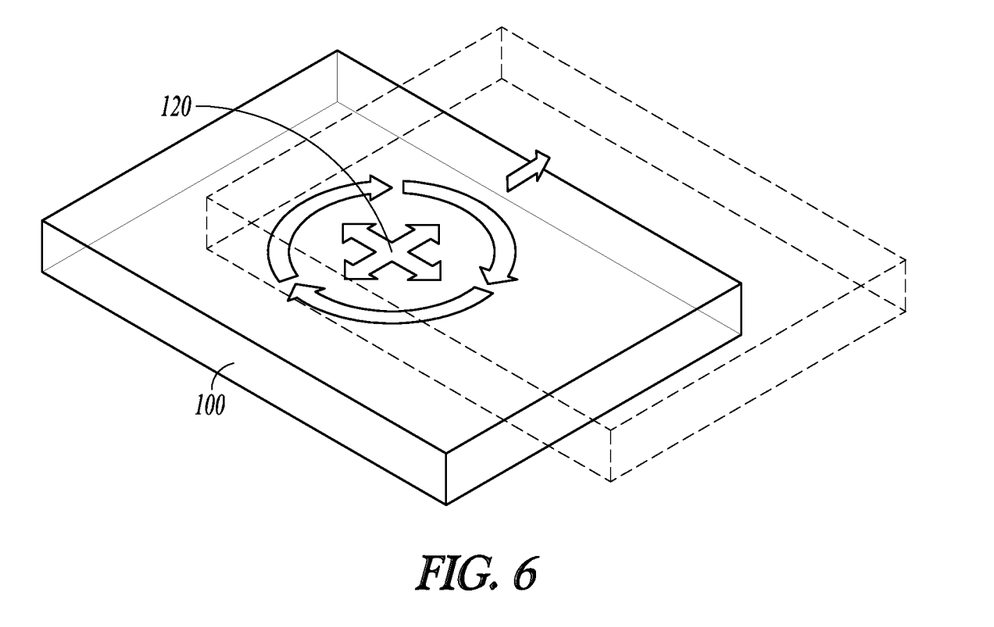
FIG. 6 illustrates a modification of a position handler of the ROI widget of FIG. 1 in order to change the pan, tilt, or zoom of a camera and the field of view of the camera.

FIG. 6 illustrates the modification of a position handler of the ROI widget of FIG. 1 in order to change the pan, tilt, or zoom of a camera and the field of view of the camera. Specifically, FIG. 6 illustrates the use of the position handler 120 to cause a change in location of the widget 100, thereby causing a change in one or more of the pan, tilt, and zoom parameters of the associated camera, and thereby changing the footprint of the associated camera.

Figure 7A:
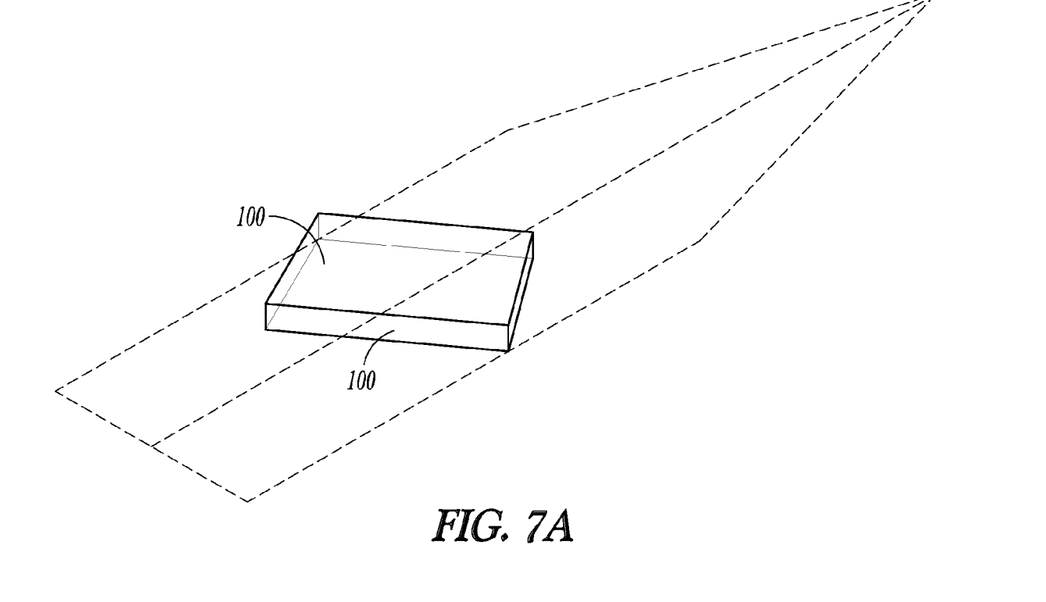
FIG. 7A illustrates a view of the ROI widget of FIG. 1 from the view of a third party.
Figure 7B:
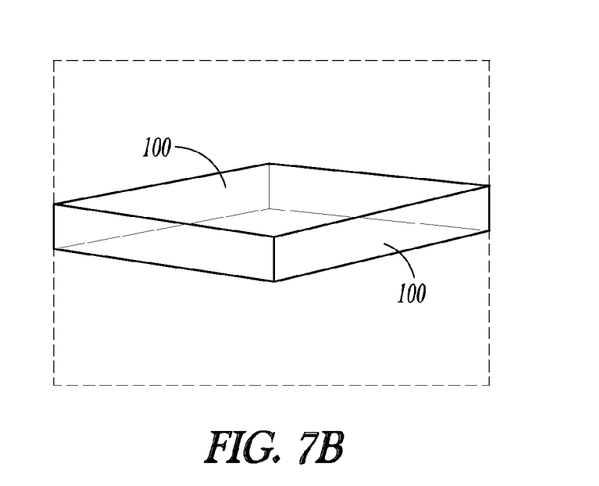
FIG. 7B illustrates a view of the ROI widget of FIG. 1 from the view of the video sensing device.

FIG. 7A illustrates a view of the ROI widget 100 of FIG. 1 from the view of a third party, and FIG. 7B illustrates a view of the ROI widget 100 of FIG. 1 from the view of the video sensing device.

Figure 8:
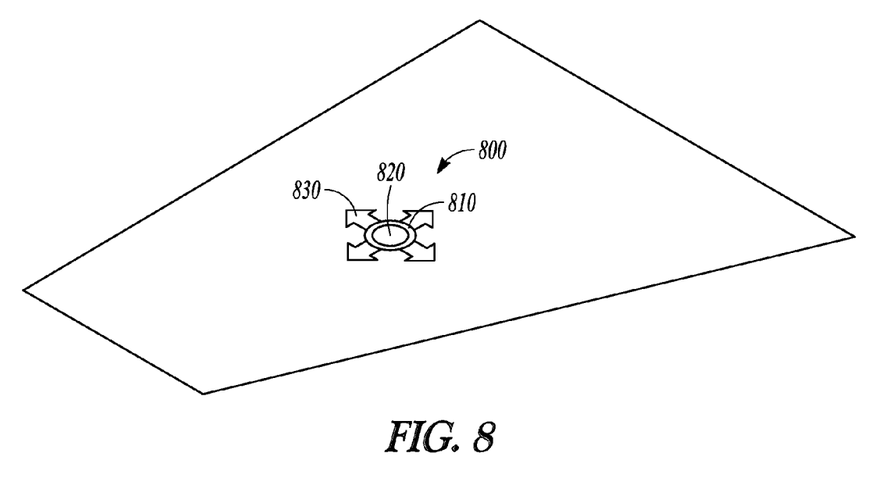
FIG. 8 illustrates a focus cursor widget in a field of view.
Figure 9:
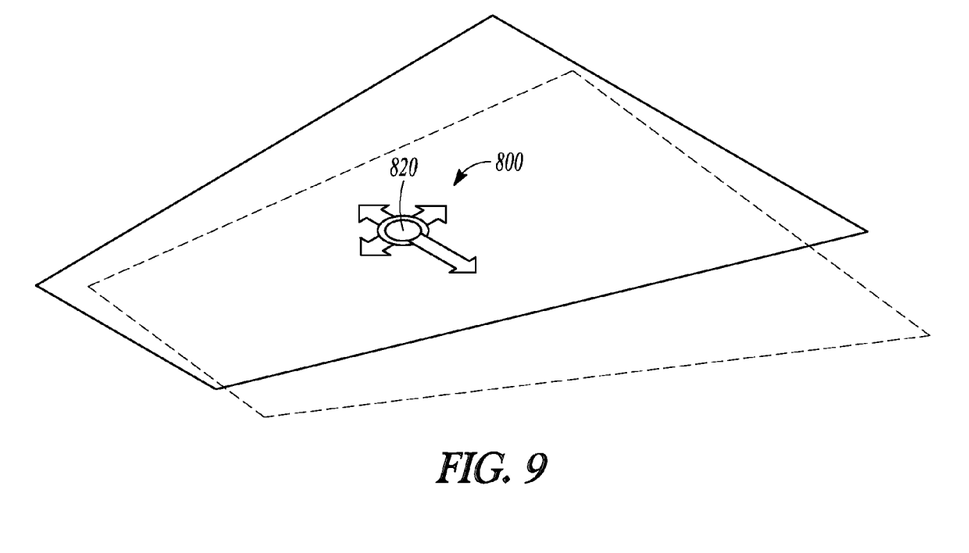
FIG. 9 illustrates a manipulation of a focus cursor widget via a position handler of the focus cursor.
Figure 10:
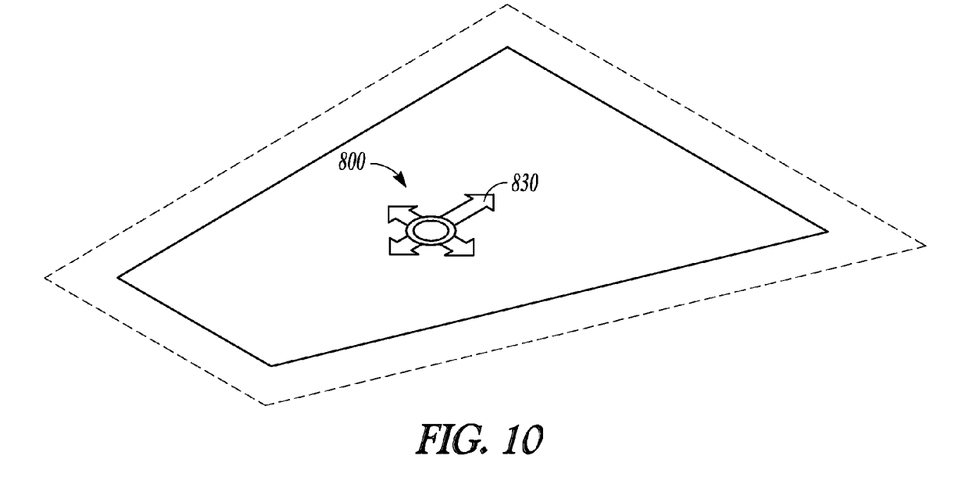
FIG. 10 illustrates a manipulation of a focus cursor widget via a zoom handler of the focus cursor.
Figure 11:
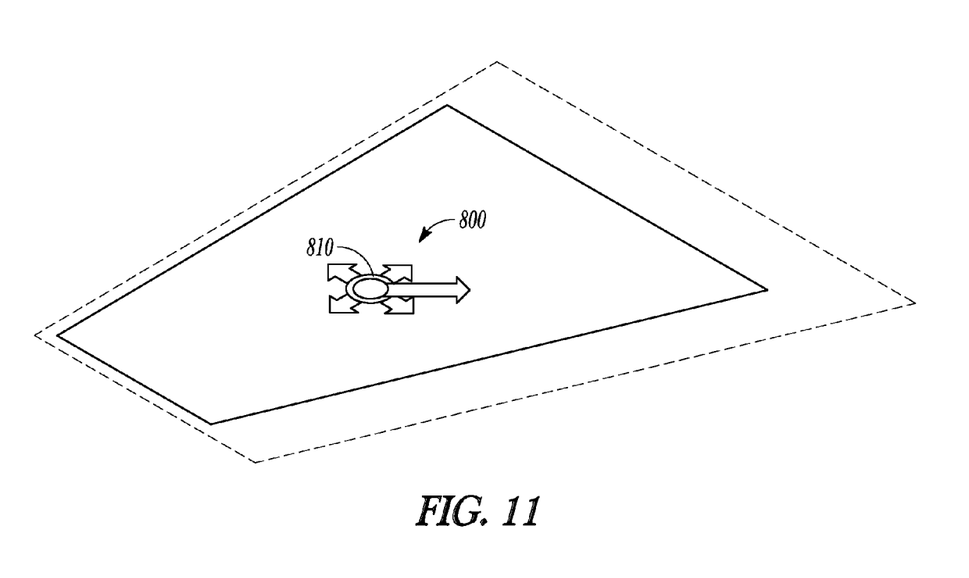
FIG. 11 illustrates a manipulation of a focus cursor widget via a ring handler of the focus cursor.

FIGS. 8-13 illustrate the use of a three dimensional focus cursor 800. The focus cursor 800 indicates an associated camera's focus point. As illustrated in FIG. 8, the focus cursor 800 is provided with a ring widget 810, a position widget 820, and a zoom widget 830. FIG. 9 illustrates that the dragging of the position handler 820 changes the focus of the camera, and causes the automatic recalculation of one or more of the pan, tilt, and zoom parameters of the associated camera so that the associated camera can readjust to the new focal point. FIG. 10 illustrates the use of the zoom handler 830, to zoom the focal point of the camera in or out, thereby resulting in a change to the zoom parameter of the associated camera. FIG. 11 illustrates the resizing of the focal point via the ring handler 810, which results in a change in the area of the focal point of the associated camera.

Figure 12:
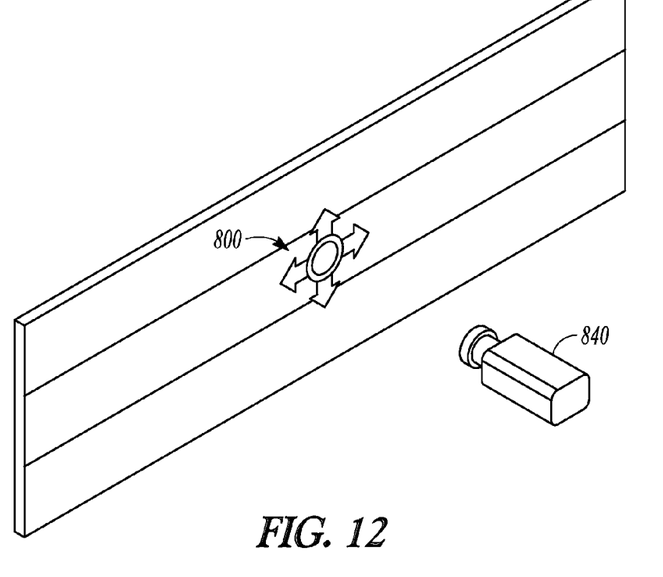
FIG. 12 illustrates a focus cursor in full view positioned on a wall.
Figure 13:
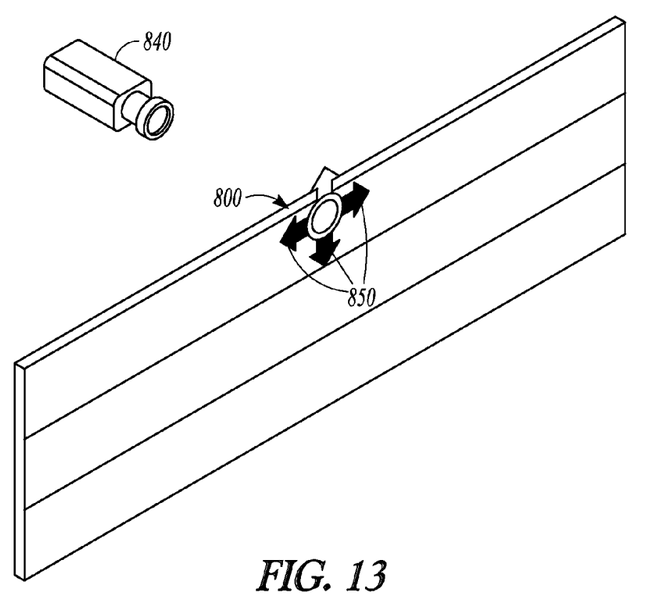
FIG. 13 illustrates a focus cursor in partial view positioned on a wall.

FIGS. 12 and 13 illustrate the changing characteristics of the focus cursor 800 from different perspectives of view. In FIG. 12, the camera is located at 840, and the positioning of the focus cursor 800 on a wall shows that there is no change to the focus cursor 800. However, in FIG. 13, when the perspective is changed to a view on the other side of the wall, the characteristics 850 (solid arrows) of the focus cursor 800 are changed to indicate that if the focus cursor is placed at this point, the associated camera will not be able to focus on this point because it is out of the field of view of the camera.

A method to determine the pan, tilt, and zoom parameters from the region of interest widget is as follows. For a cube embodiment, get the eight vertices' positions $P_i$ ($x_i$ $y_i$ $z_i$ wherein i=0, 1, 2, 3, 4, 5, 6, 7). Transform the points $P_i$ to sphere coordinates $S_i$ ($\theta_i$ $\Phi_i$ $\rho_i$ wherein i=0, 1, 2, 3, 4, 5, 6, 7) with the position of the camera as the origin, using the following equation.

$$p = \sqrt{x^2 + y^2 + z^2}$$
$$\theta = \arccos\left(\frac{z}{p}\right)$$
$$\varphi = \arctan\left(\frac{y}{x}\right)$$

Then, the camera's pan, tilt, and zoom parameters can be calculated using the points $S_i$ as follows:

Pan=(max($\phi_i$|i=0,1 ... 7)+min($\phi_i$|i=0,1 ... 7))/2

Tilt=(max($\theta_i$|i=0,1 ... 7)+min($\theta_i$|i=0,1 ... 7))/2

FOVy=max(max($\theta_i$|i=0,1 ... 7)−min($\theta_i$|i=0,1 ... 7),(max($\phi_i$|i=0,1 ... 7)−min($\phi_i$|i=0,1 ... 7))/aspect_ratio)

A method to determine the pan and tilt parameters from a focus cursor is as follows. The position P at which the camera is focused can be obtained from the position of the position handler or the ring handler. Also, from the position of the camera, the direction of the camera can be obtained as follows:

D(x,y,z)(D=position of camera focus−camera position)

The pan and tilt can then be determined as follows:

$$\text{pan} = \arctan\left(\frac{x}{y}\right)$$
$$\text{tilt} = \arcsin\left(\frac{z}{\sqrt{x^2 + y^2 + z^2}}\right)$$

To get the zoom of the camera, the offset (S) of the zoom handler and the ring handler in the three dimensional environment is used. Then, the focal length of the camera can be calculated as follows:

$$f = f_{prior} + k*S \text{ ($k$ is a scale factor)}$$

Example Embodiments

Example No. 1 is a system including a video sensing device, a computer processor coupled to the video sensing device, and a display unit coupled to the computer processor. The system is configured to display on the display unit a field of view of the video sensing device, display a three dimensional widget within the field of view, wherein the widget comprises one or more features for altering one or more of a location or size of the widget, thereby altering an area in the field of view covered by the widget, and alter one or more of a pan, a tilt, and a zoom of the video sensing device as a function of the alteration of the location or size of the widget, thereby altering the field of view of the video sensing device.

Example No. 2 includes the features of Example No. 1 and optionally includes a system wherein the widget comprises one or more of a cube, a sphere, or a cone.

Example No. 3 includes the features of Example Nos. 1-2 and optionally includes a system wherein the display unit comprises a touch sensitive screen, and wherein the input via the widget is received via the touch sensitive screen.

Example No. 4 includes the features of Example Nos. 1-3 and optionally includes a system wherein the input via the widget is received via one or more of a mouse and screen cursor.

Example No. 5 includes the features of Example Nos. 1-4 and optionally includes a system wherein the field of view comprises an image of the area or a map of the area.

Example No. 6 includes the features of Example Nos. 1-5 and optionally includes a system wherein the one or more features of the widget comprise a position handler, a rotation handler, a surface handler, an edge handler, and a vertex handler.

Example No. 7 includes the features of Example Nos. 1-6 and optionally includes a system wherein one or more of the location and size of the widget is altered by manipulation via the position handler, the rotation handler, the surface handler, the edge handler, and the vertex handler.

Example No. 8 includes the features of Example Nos. 1-7 and optionally includes a system configured to display the widget and the field of view of the video sensing device from one or more of a perspective that is lateral to the field of view and a perspective of the video sensing device.

Example No. 9 includes the features of Example Nos. 1-8 and optionally includes a system configured to display an indication on the display unit when a pan limit, a tilt limit, or a zoom limit of the video sensing device is reached.

Example No. 10 includes the features of Example Nos. 1-9 and optionally includes a system wherein when one or more of the pan limit, the tilt limit, and the zoom limit exceeds one or more capabilities of the video sensing device, the system displays, via an icon of the video sensing device and an icon representing the area covered by the video sensing device, an indication of the limits of the area capable of being covered by the video sensing device.

Example No. 11 includes the features of Example Nos. 1-10 and optionally includes a system configured to receive input from a user, and display a location of interest in the field of view of the video sensing device as a function of the user input.

Example No. 12 includes the features of Example Nos. 1-11 and optionally includes a system configured to display an icon on the display unit indicating the location of interest, to receive input from the user via the location of interest icon, and to alter the pan, tilt, and zoom of the video sensing device as a function of the input received via the location of interest icon so that the location of interest is displayed on the display unit.

Example No. 13 includes the features of Example Nos. 1-12 and optionally includes a system configured to receive input from the user to disable a display of the location of interest in the field of view of the video sensing device.

Example No. 14 includes the features of Example Nos. 1-13 and optionally includes a system configured to automatically scan among a plurality of locations of interest in the field of view of the video sensing device.

Example No. 15 includes the features of Example Nos. 1-14 and optionally includes a system configured to automatically scan the plurality of locations of interest on a periodic basis.

Example No. 16 includes the features of Example Nos. 1-15 and optionally includes a system configured to receive input from a user to add a new location of interest in the field of view of the video sensing device while the plurality of locations of interest in the field of view is being scanned by the video sensing device.

Example No. 17 includes the features of Example Nos. 1-16 and optionally includes a system configured to display an identifier of the video sensing device and the pan, tilt and zoom parameters of the video sensing device.

Example No. 18 includes the features of Example Nos. 1-17 and optionally includes a system configured to display a three dimensional focus cursor on the display unit, the focus cursor positioned at a focus point of the video sensing device in the area, thereby defining a three dimensional area covered by the field of view of the video sensing device.

Example No. 19 includes the features of Example Nos. 1-18 and optionally includes a system wherein the focus cursor comprises one or more of a position handler, a zoom handler, and a ring handler; and wherein the focus point of the video sensing device is modified via the position handler, the zoom handler, and the ring handler.

Example No. 20 includes the features of Example Nos. 1-19 and optionally includes a system wherein a characteristic of the focus cursor is altered when a portion of the field of view is occluded.

Figure 14:
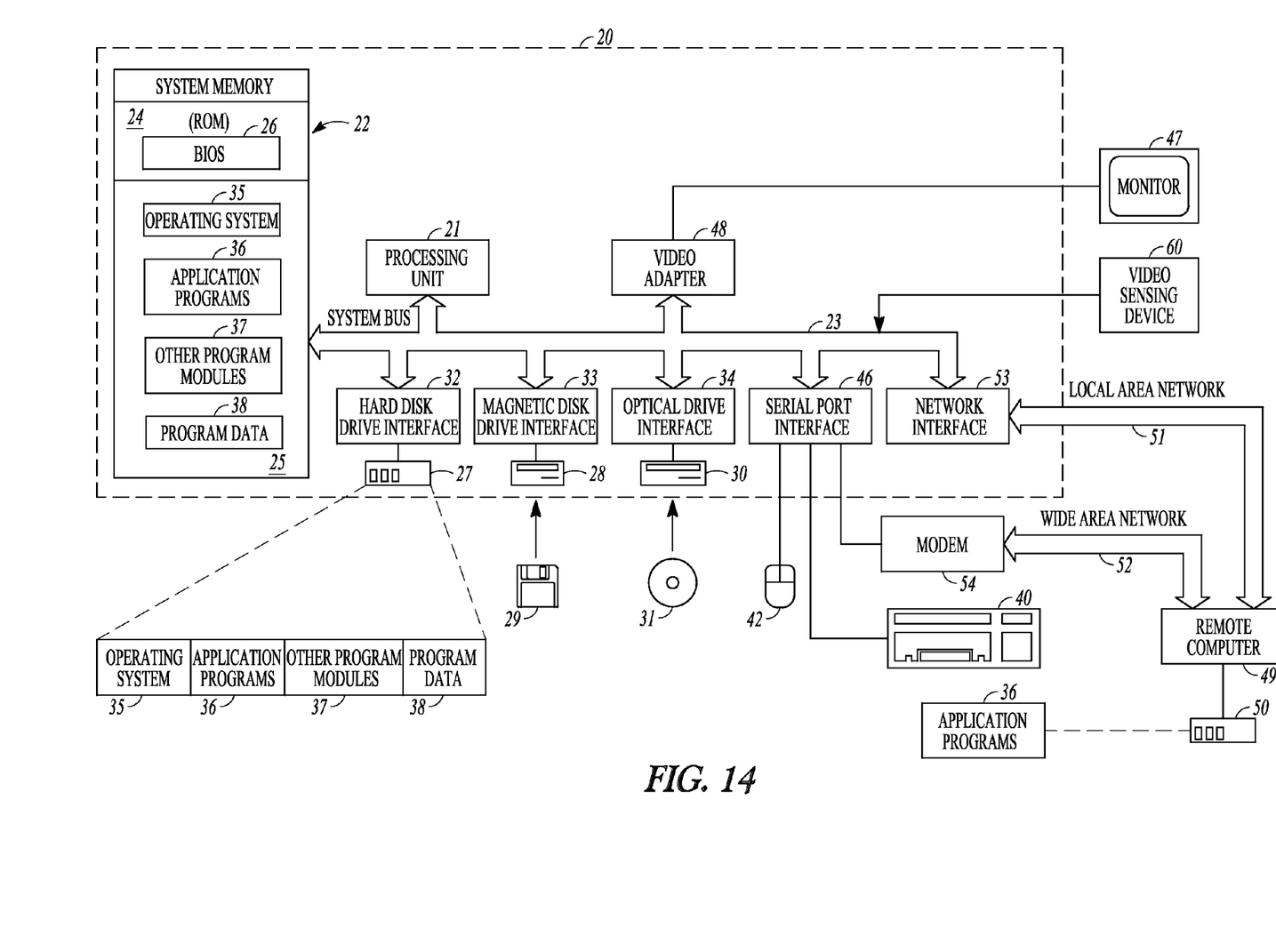
FIG. 14 illustrates a computer processor system upon which one or more embodiments can execute.

FIG. 14 is an overview diagram of a hardware and operating environment in conjunction with which embodiments of the invention may be practiced. The description of FIG. 14 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 14, a hardware and operating environment is provided that is applicable to any of the servers and/or remote clients shown in the other Figures.

As shown in FIG. 14, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 14 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Video sensing device 60 is coupled to the processing unit 21 via system bus 23, and is coupled to the monitor 47 via the system bus 23 and the video adapter 48.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
   a video sensing device;
   a computer processor coupled to the video sensing device; and
   a display unit coupled to the computer processor;
   wherein the system is configured to:
      display on the display unit a field of view of the video sensing device;
      display a three dimensional widget on the display unit within the field of view, wherein the widget comprises one or more features for altering one or more of a location or size of the entire widget, thereby altering an area in the field of view covered by the video sensing device; and
      alter one or more of a pan, a tilt, and a zoom of the video sensing device as a function of the alteration of the location or size of the widget, thereby altering the field of view of the video sensing device;
   wherein the field of view comprises an image of the area or a map of the area;
   wherein the one or more features of the widget comprise a position handler, a rotation handler, a surface handler, an edge handler, and a vertex handler; and
   wherein one or more of the location and size of the widget is altered by manipulation via the position handler, the rotation handler, the surface handler, the edge handler, and the vertex handler.

2. The system of claim 1, wherein the widget comprises one or more of a cube, a sphere, or a cone.

3. The system of claim 1, wherein the display unit comprises a touch sensitive screen, and wherein the input via the widget is received via the touch sensitive screen.

4. The system of claim 1, wherein the input via the widget is received via one or more of a mouse and screen cursor.

5. The system of claim 1, configured to display the widget and the field of view of the video sensing device from one or more of a perspective that is lateral to the field of view and a perspective of the video sensing device.

6. The system of claim 1, configured to display an indication on the display unit when a pan limit, a tilt limit, or a zoom limit of the video sensing device is reached.

7. The system of claim 6, wherein when one or more of the pan limit, the tilt limit, and the zoom limit exceeds one or more capabilities of the video sensing device, the system displays, via an icon of the video sensing device and an icon representing the area covered by the video sensing device, an indication of the limits of the area capable of being covered by the video sensing device.

8. The system of claim 1, configured to receive input from a user, and display a location of interest in the field of view of the video sensing device as a function of the user input.

9. The system of claim 8, configured to display an icon on the display unit indicating the location of interest, to receive input from the user via the location of interest icon, and to alter the pan, tilt, and zoom of the video sensing device as a function of the input received via the location of interest icon so that the location of interest is displayed on the display unit.

10. The system of claim 8, configured to receive input from the user to disable a display of the location of interest in the field of view of the video sensing device.

11. The system of claim 8, configured to automatically scan among a plurality of locations of interest in the field of view of the video sensing device.

12. The system of claim 11, configured to automatically scan the plurality of locations of interest on a periodic basis.

13. The system of claim 11, configured to receive input from a user to add a new location of interest in the field of view of the video sensing device while the plurality of locations of interest in the field of view is being scanned by the video sensing device.

14. The system of claim 1, configured to display an identifier of the video sensing device and the pan, tilt and zoom parameters of the video sensing device.

15. The system of claim 1, configured to display a three dimensional focus cursor on the display unit, the focus cursor positioned at a focus point of the video sensing device in the area, thereby defining a three dimensional area covered by the field of view of the video sensing device.

16. The system of claim 15, wherein the focus cursor comprises one or more of a position handler, a zoom handler, and a ring handler; and wherein the focus point of the video sensing device is modified via the position handler, the zoom handler, and the ring handler.

17. The system of claim 15, wherein a characteristic of the focus cursor is altered when a portion of the field of view is occluded.

\* \* \* \* \*